United States Patent [19]
Lutz et al.

[11] Patent Number: 5,994,428
[45] Date of Patent: Nov. 30, 1999

[54] STORAGE-STABLE, SILANE-MODIFIED CORE-SHELL COPOLYMERS

[75] Inventors: Hermann Lutz, Emmerting; Theo Mayer, Haiming; Thomas Bastelberger, Emmerting, all of Germany

[73] Assignee: Wacker-Chemie GmbH, Munich, Germany

[21] Appl. No.: 09/128,921

[22] Filed: Aug. 4, 1998

[30] Foreign Application Priority Data

Aug. 21, 1997 [DE] Germany ............ 197 36 409

[51] Int. Cl.⁶ .................................... C08F 275/00
[52] U.S. Cl. .......................... 523/201; 525/288
[58] Field of Search ............................ 523/201

[56] References Cited

U.S. PATENT DOCUMENTS

| | | |
|---|---|---|
| 5,100,948 | 3/1992 | Aydin et al. . |
| 5,332,766 | 7/1994 | Takaya ................... 523/201 |
| 5,576,384 | 11/1996 | Nolken et al. . |
| 5,708,093 | 1/1998 | Bastelberger et al. . |
| 5,753,733 | 5/1998 | Eck et al. . |

FOREIGN PATENT DOCUMENTS

| | | |
|---|---|---|
| 0444827 | 9/1991 | European Pat. Off. . |
| 0366969 | 12/1992 | European Pat. Off. . |
| 0327006 | 1/1993 | European Pat. Off. . |
| 0687277 | 6/1997 | European Pat. Off. . |
| 2148456 | 9/1975 | Germany . |
| 2148457 | 1/1978 | Germany . |
| 1407827 | 8/1972 | United Kingdom . |

OTHER PUBLICATIONS

"Vinyl and Diene Monomers", Part 1, E. Leonard Ed., Wiley–Interscience, New York (1970), p. 149 ff.
W.A. Lee/R.A.Rutherford: "Plymer Handbook", 2nd Edition, J. Wiley & Sons, New York (1975), pp. III 139 ff.

Primary Examiner—Paul R. Michl
Attorney, Agent, or Firm—Burgess, Ryan & Wayne

[57] ABSTRACT

Storage-stable, silane-modified core-shell copolymers are provided comprising a shell-forming copolymer I of
a) from 70 to 95% by weight, based on the overall weight of the shell, of acrylic and/or methacrylic $C_1$- to $C_{10}$-alkyl esters of which from 20 to 80% by weight have a water solubility of not more than 2 g/l and from 80 to 20% by weight, based in each case on the comonomers a), have a water solubility of at least 10 g/l, and
b) from 5 to 30% by weight, based on the overall weight of the shell, of one or more ethylenically unsaturated, functional and water-soluble monomers including a proportion of from 25 to 100% by weight, based on the comonomers b), of unsaturated carboxylic acids, and a core-forming copolymer II of one or more monomers c) from the group of the vinyl esters, monoolefinically unsaturated mono- or dicarboxylic esters, vinylaromatic compounds, olefins, 1,3-dienes and vinyl halides,
wherein the shell contains no silane compounds and the core comprises one or more silane compounds d) from the group of the mercaptosilanes alone or in combination with olefinically unsaturated, hydrolyzable silicon compounds.

11 Claims, No Drawings

1

STORAGE-STABLE, SILANE-MODIFIED CORE-SHELL COPOLYMERS

BACKGROUND OF THE INVENTION

1) Field of the Invention

The invention relates to storage-stable, silane-modified core-shell copolymers, to processes for preparing storage-stable, silane-modified core-shell copolymer dispersions and powders, and to their use.

2) Background Art

Alkoxysilane-functional copolymers are frequently employed in practice as building adhesives (DE-B 2148456=GB-A 1407827) or for preparing emulsion paints and polymer-based plasters (DE-A 2148457=GB-A 1407827, EP-A 327006=U.S. Pat. No. 5,576,384). The alkoxysilane groups are incorporated by polymerization into the copolymers in order to improve the wet adhesion and the water resistance in the case of use as coating materials, and to improve the adhesion to mineral substrates in the case of use as building adhesives or tile adhesives.

A problem when using alkoxysilane-functional copolymers, especially in the form of their aqueous dispersions, is their tendency to premature crosslinking through hydrolytic condensation reactions of the alkoxysilane groups. As a consequence, aqueous dispersions of alkoxysilane-functional copolymers frequently possess inadequate stability on storage and when stored for several months lose their very good binder properties.

EP-B 687277 discloses aqueous dispersions of core-shell copolymers which are obtainable by a procedure in which the alkoxysilane-functional comonomers are reacted with a small amount of predominantly hydrophilic comonomers to give a water-swellable or water-soluble addition polymer which subsequently, in the polymerization of the major amount of hydrophobic comonomer, envelops the hydrophobic core formed in the polymerization. This gives core-shell polymers in which the alkoxysilane-functional comonomer units are present externally in the shell, with the effect that very good adhesion properties result with relatively small amounts of alkoxysilane-functional comonomer. A disadvantage, however, is that after these dispersions have been stored for six months the very good binder properties (adhesive strengths under tension following dry and wet storage) in dispersion tile adhesives and plasters are no longer achieved.

EP-A 444827 discloses silane-modified core-shell copolymer dispersions, for preparing elastic coatings, which comprise a core of vinyl ester-olefin-acrylate-vinylsilane copolymer and a vinyl ester-olefin shell. For their preparation, part of a mixture of vinyl ester, a acrylate and vinylsilane is introduced as initial charge, ethylene is injected, and the remainder of the comonomer mixture is metered in. After the end of the metered addition of silane-containing monomer, a second metered, silane-free vinyl ester addition is started. This process achieves the formation of a silane-containing, hydrophobic core, which has particular strength owing to crosslinking by way of the silane functions, and the formation of a silane-free shell. Although the silane component of these core-shell polymers is concentrated in the core and surrounded by a shell, the tensile adhesion values achieved following wet storage with this system when used as a tile adhesive are extremely poor.

From EP-A 366969 (U.S. Pat. No. 5,100,948) it is known that ceramic tile adhesives based on aqueous dispersions of polymers comprising mercaptosilane rather than vinylsilane units exhibit greater water resistance in the solidified state than do vinylsilane-containing polymer dispersions.

The object, therefore, starting from the silane-modified core-shell copolymers of EP-A 687277, was to provide storage-stable, silane-modified core-shell copolymer dispersions with which high-grade binder properties are obtained via the crosslinking of the silane functions even after storage at room temperature for 12 months.

SUMMARY OF THE INVENTION

It has surprisingly been found that the polymerized incorporation of hydrolyzable organosilicon polymerization regulators, such as mercaptosilanes, in the core polymer gives core-shell polymers which have very good binder properties even after 12 months of storage. It has also been found that the combination of mercaptosilanes and olefinically unsaturated silicon compounds in the core polymer achieves a further marked improvement in the profile of properties.

The invention provides storage-stable, silane-modified core-shell copolymers comprising a shell-forming copolymer I of
a) from 70 to 95% by weight, based on the overall weight of the shell, of acrylic and/or methacrylic $C_1$- to $C_{10}$-alkyl esters of which from 20 to 80% by weight have a water solubility of not more than 2 g/l and from 80 to 20% by weight, based in each case on the comonomers a), have a water solubility of at least 10 g/l, and
b) from 5 to 30% by weight, based on the overall weight of the shell, of one or more ethylenically unsaturated, functional and water-soluble monomers including a proportion of from 25 to 100% by weight, based on the comonomers b), of unsaturated carboxylic acids, and a core-forming copolymer II of one or more monomers c) from the group of the vinyl esters, monoolefinically unsaturated mono- or dicarboxylic esters, vinylaromatic compounds, olefins, 1,3-dienes and vinyl halides,
wherein the shell contains no silane compounds and the core comprises one or more silane compounds d) from the group of the mercaptosilanes alone or in combination with olefinically unsaturated, hydrolyzable silicon compounds.

The invention also provides a process for preparing storage-stable, silane-modified core-shell copolymer dispersions and powders by free-radical emulsion polymerization of a comonomer mixture I comprising
a) from 70 to 95% by weight, based on the overall weight of the comonomer mixture I, of acrylic and/or methacrylic $C_1$- to $C_{10}$-alkyl esters of which from 20 to 80% by weight have a water solubility of not more than 2 g/l and from 80 to 20% by weight, based in each case on the comonomers a), have a water solubility of at least 10 g/l, and
b) from 5 to 30% by weight, based on the overall weight of the comonomer mixture I, of one or more ethylenically unsaturated, functional and water-soluble monomers including a proportion of from 25 to 100% by weight, based on the comonomers b), of unsaturated carboxylic acids, and the comonomer mixture I is introduced into a reactor together with water and emulsifier at a pH of from 2 to 5, polymerization is started by adding an initiator at a temperature of from 40° C. to 90° C. and, at a conversion of at least 40% of the comonomer mixture I, a comonomer mixture II comprising one or more monomers c) from the group of the vinyl esters, monoolefinically unsaturated mono- or dicarboxylic esters, vinylaromatic compounds, olefins, 1,3-dienes and vinyl halides is metered in, alone or with further emulsifier and initiator, and the resulting copolymer dispersion is dried if desired, wherein the comonomer mixture I contains no silane compounds and the comonomer mixture II comprises one or more silane compounds d) from the group of the mercaptosilanes alone or in combination with one or more olefinically unsaturated, hydrolyzable silicon compounds.

DESCRIPTION OF THE PREFERRED EMBODIMENTS

The proportion of the comonomer mixture I and hence the proportion of the shell polymer I is from 2 to 25% by weight, based on the overall weight of the core-shell copolymer. Suitable constituents of the mixture a) are the esters of acrylic and/or methacrylic acid with straight-chain or branched aliphatic $C_1$ to $C_{10}$ alcohols, alone or in combination with the corresponding diesters of fumaric or maleic acid. A table relating to the water solubility of these esters is given in "Vinyl and Diene Monomers, Part 1", E. C. Leonard Ed., Wiley-Interscience, New York (1970) p. 149 ff.

Examples of suitable esters of acrylic, methacrylic, fumaric or maleic acid having a water solubility of not more than 2 g/l are butyl acrylate, ethylhexyl acrylate, ethyl methacrylate, butyl methacrylate, dibutyl maleate or fumarate and diethylhexyl maleate or fumarate. It is preferred to use butyl acrylate and/or ethylhexyl acrylate. If desired, said esters of acrylic, methacrylic, fumaric and maleic acid can also be replaced in part by one or more monomers from the group of the vinyl esters of branched or unbranched monocarboxylic acids having 1 to 12 carbon atoms, such as vinyl acetate, vinylaromatic compounds, such as styrene, olefins, such as ethylene, 1,3-dienes, such as 1,3-butadiene, and vinyl chloride.

Examples of suitable esters having a water solubility of more than 10 g/l are methyl acrylate, methyl acrylate and ethyl acrylate. Particular preference is given to ethyl acrylate and/or methyl methacrylate.

Suitable water-soluble monomers b) are acrylic, methacrylic, itaconic, fumaric and/or maleic acid and/or the corresponding alkali metal and ammonium salts; the monoamides and possibly diamides thereof, which may be substituted on the nitrogen once or twice by the methylol group; the monoesters of said dicarboxylic acids with $C_1$ to $C_3$ alcohols; the vinylsulfonates, the sulfonate-group-substituted esters of unsaturated carboxylic acids, such as sulfoethyl methacrylate or sulfopropyl methacrylate, the sulfonate-group-substituted amides of unsaturated carboxylic acids, such as acrylamidomethylpropanesulfonic acid, sulfonate-group-substituted styrenes, such as styrenesulfonic acid; N-vinylpyrrolidone, N-vinylformamide and the hydroxyl-substituted esters of unsaturated carboxylic acids. By water solubility here is meant that under standard conditions more than 10 g/l are soluble in water.

Preferred water-soluble monomers b) are acrylic acid, methacrylic acid and the alkali metal and ammonium salts thereof, acrylamide, methacrylamide, N-methylolacrylamide, N-methylolmethacrylamide, hydroxyethyl acrylate, vinyl sulfonate, and sulfonate-group-substituted esters and amides of acrylic and methacrylic acid, such as sulfoethyl and sulfopropyl methacrylate and acrylamidomethylpropanesulfonic acid. Particular preference is given to acrylic acid, methacrylic acid, acrylamide and methacrylamide. Particular preference is also given to embodiments in which alongside the comonomers specified as being of particular preference there is copolymerized from 0.01 to 10% by weight, based on the overall weight of the shell polymer I, of comonomers comprising sulfonate groups, such as vinyl sulfonate, sulfoethyl and sulfopropyl methacrylate, styrenesulfonic acid, allyl sulfonate, methallyl sulfonate and acrylamidomethylpropanesulfonic acid.

The proportion of the comonomer mixture II and hence the proportion of the core polymer is from 75 to 98% by weight, based on the overall weight of the core-shell copolymer. The core polymer, or the comonomer mixture II used to prepare it, comprises one or more monomers c) from the group of the vinyl esters of branched and unbranched carboxylic acids having 1 to 12 carbon atoms, such as vinyl acetate, vinyl propionate, vinyl pivalate, vinyl ethylhexanoate, VeoVa9® and VeoVa10® (trademark of Shell Corporation's vinyl esters of alpha-branched carboxylic acids having 9 to 10 carbon atoms), vinyl 2-ethylhexanoate and vinyl pivalate; monoolefinically unsaturated mono- or dicarboxylic esters whose acid component consists of 3 to carbon atoms and whose alcohol component consists of 1 to 8 carbon atoms, examples being acrylic and methacrylic esters of methanol, ethanol, butanol and 2-ethylhexanol, such as methyl methacrylate, butyl acrylate, 2-ethylhexyl acrylate; vinylaromatic compounds, such as styrene and vinyltoluene; olefins, such as ethylene and propylene; 1,3-dienes, such as butadiene and isoprene; and vinyl halides, such as vinyl chloride.

In minor amounts it is also possible for polyethylenically unsaturated monomers to be employed, such as allyl methacrylate, divinyl adipate, butanediol diacrylate and triallyl cyanurate in amounts of from 0 to 2% by weight, preferably from 0.05 to 0.5% by weight, based in each case on the overall weight of the comonomer mixture II.

Suitable silane compounds d) are one or more mercaptosilanes of the general formula HS—$CR_2$—$SiR'_3$ in which R is identical or different at each occurrence and has the definition H and $C_1$- to $C_6$-alkyl group, R' is identical or different at each occurrence and has the definition $C_1$- to $C_6$-alkyl group and $C_1$- to $C_6$-alkoxy group, at least one of the radicals R' being an alkoxy group. Preference is given to 3-mercaptopropyltriethoxysilane, 3-mercaptopropyltrimethoxysilane and 3-mercaptopropylmethyldimethoxysilane. The mercaptosilanes are generally present in an amount of from 0.01 to 10% by weight, based on the overall weight of the core polymer II.

Also suitable as silane compound d) in combination with said mercaptosilanes are one or more olefinically unsaturated, hydrolyzable silicon compounds of the general formula $R^1Si(CH_3)_{0-2}(OR^2)_{3-1}$ where $R^1$ has the definition $CH_2$=$CR^3$—$(CH_2)_{0-1}$ or $CH_2$=$CR^3CO_2(CH_2)_{1-3}$, $R^2$ is an unbranched or branched, unsubstituted or substituted alkyl radical having 3 to 12 carbon atoms which can if desired be interrupted by an ether group, and $R^3$ is H or $CH_3$. The olefinically unsaturated, hydrolyzable silicon compounds can be copolymerized additionally to the mercaptosilane component in an amount of from 0.01 to 10% by weight, based on the overall weight of the core polymer II. Preference is given to gamma-acryl- and/or gamma-methacryloxypropyltri(alkoxy)silanes, vinylalkyldialkoxysilanes and vinyltrialkoxysilanes, examples of alkoxy groups which can be employed being methoxy, ethoxy, methoxyethylene, ethoxyethylene, methoxypropylene glycol ether and ethoxypropylene glycol ether radicals. It is also possible to use trisacetoxyvinylsilane. Particular preference is given to vinyltriethoxysilane, gamma-methacryloxypropyltriethoxysilane and trisacetoxyvinylsilane.

As silane compound d) present in the core polymer II preference is given to exclusively from 0.01 to 5% by weight of mercaptosilane, based on the overall weight of the core polymer II. Maximum preference is given to core polymers II including from 0.01 to 5% by weight, based on the overall weight of the core polymer II, of at least one mercaptosilane and at least one olefinically unsaturated silane. The weight ratio of mercaptosilane to olefinically unsaturated silane in this case is preferably from 20:1 to 1:20.

Preference is given to core-shell copolymers including from 5 to 15% by weight of a shell copolymer I of a) from 80 to 95% by weight, based on the overall weight of the shell, of comonomer a), of which from 30 to 70% by weight is butyl acrylate and/or ethylhexyl acrylate and from 30 to 70% by weight, based in each case on the overall weight of the comonomers a), is ethyl acrylate and/or methyl methacrylate, b) from 4.5 to 19.5% by weight, based on the overall weight of the shell, of acrylic acid and/or methacrylic acid, alone or together with acrylamide and/or methacrylamide, and c) from 0.01 to 10% by weight, based on the overall weight of the shell, of one or more sulfonate-functional monomers from the group vinyl sulfonate, sulfoethyl and sulfopropyl methacrylate, styrenesulfonic acid, allyl sulfonate, methallyl sulfonate and acrylamidomethylpropanesulfonic acid.

Preference is also given to core-shell copolymers including from 85 to 95% by weight of a core polymer II which is based on vinyl chloride-ethylene, vinyl chloride-ethylene-vinyl acetate, vinyl chloride-ethylene-VeoVa9®, vinyl chloride-ethylene-VeoVa10®, vinyl acetate-ethylene, vinyl acetate-VeoVa9®, vinyl acetate-VeoVa10®, methyl methacrylate-2-ethylhexyl acrylate, methyl methacrylate-butyl acrylate, methyl methacrylate-butyl acrylate-VeoVa9®, methyl methacrylate-butyl acrylate-VeoVa10®, styrene-butyl acrylate, styrene-butyl acrylate-VeoVa9®, styrene-butyl acrylate-VeoVa10®, styrene-2-ethylhexyl acrylate, styrene-2-ethylhexyl acrylate-VeoVa9®, styrene-2-ethylhexyl acrylate-VeoVa10®, and styrene-1,3-butadiene mixtures. The proportions in these mixtures are chosen so as to give core polymers having a glass transition temperature Tg of from −60° C. to +100° C. The glass transition temperature Tg of the polymers can be determined in known manner by means of differential scanning calorimetry (DSC). The Tg can also be calculated approximately in advance by means of the Fox equation (Fox, T. G., Bull. Am. Physics Soc. 1, 3, page 123, 1956). Tg values for homopolymers are listed in Polymer Handbook 2nd Edition, J. Wiley and Sons, New York (1975).

In these preferred embodiments of the core polymer II there is also from 0.01 to 10, preferably from 0.01 to 5% by weight of mercaptosilanes from the group 3-mercaptopropyltriethoxysilane, 3-mercaptopropyltrimethoxysilane and 3-mercaptopropylmethyldimethoxysilane, or from 0.01 to 10% by weight, preferably from 0.01 to 5% by weight, based on the overall weight of the core polymer II, of at least one of said mercaptosilanes and at least one olefinically unsaturated silane from the group gamma-acryl- and gamma-methacryloxypropyltri(alkoxy)silanes, vinyltrialkoxysilanes and trisacetoxyvinylsilane in a weight ratio of from 20:1 to 1:20.

The process can be carried out such that the polymerization of the comonomer mixture II together with the required emulsifier and/or initiator either takes place directly following the preparation of the alkali-soluble protective colloid of the first stage, in other words directly after the end of the metered addition of the comonomer mixture I, or is carried out subsequently in a separate stage.

Suitable emulsifiers are non-ionic and/or anionic surfactants, examples being:

1) Alkyl sulfates, especially those having a chain length of 8 to 18 carbon atoms, and alkyl and alkylaryl ether sulfates having 8 to 18 carbon atoms in the hydrophobic radical and 1 to 50 ethylene oxide units.
2) Sulfonates, especially alkylsulfonates having 8 to 18 carbon atoms, alkylarylsulfonates having 8 to 18 carbon atoms, esters and monoesters of sulfosuccinic acid with monohydric alcohols or alkylphenols having 4 to 15 carbon atoms in the alkyl radical; if desired, these alcohols or alkylphenols may also be ethoxylated with from 1 to 40 ethylene oxide units.
3) Phosphoric acid partial esters and the alkali metal and ammonium salts thereof, especially alkyl and alkylaryl phosphates having 8 to 20 carbon atoms in the organic radical, alkyl ether and alkylaryl ether phosphates having 8 to 20 carbon atoms in the alkyl or alkylaryl radical and from 1 to 50 EO units.
4) Alkyl polyglycol ethers preferably comprising 8 to 40 EO units and alkyl radicals having 8 to 20 carbon atoms.
5) Alkylaryl polyglycol ethers preferably comprising 8 to 40 EO units and 8 to 20 carbon atoms in the alkyl and aryl radicals.
6) Ethylene oxide/propylene oxide (EO/PO) block copolymers preferably having from 8 to 40 EO and/or PO units.

Preferred anionic emulsifiers in the polymerization of the comonomer mixture I and on addition of the comonomer mixture II are the ethoxylated representatives of groups 1 to 5. Particular preference is given to the ethoxylated representatives of group 1.

The polymerization is started by the methods commonly employed. Particularly suitable compounds are at least partially water-soluble, preferably totally water-soluble, inorganic or organic peroxide compounds, such as peroxo compounds, hydroperoxides and peresters, and also water-soluble azo compounds. Mention may be made of alkali metal or ammonium peroxo(di)sulfates or -phosphates, hydrogen peroxide, tertiary-butyl hydroperoxide, azobiscyanovaleric acid and tertiary-butyl permaleate. Said peroxides can also be combined if desired with reducing agents in a known manner. Examples of suitable reducing agents are alkali metal formaldehydesulfoxylates (BRÜGGOLIT®, RONGALIT®), alkali metal sulfites and alkali metal bisulfites, alkali metal thiosulfates and ascorbic acid. In that case, in a known manner, the use of small amounts of heavy metal salts is also frequently appropriate, examples being iron(II) salts. Particular preference is given to thermal polymerization with alkali metal or ammonium peroxo(di)sulfates. The amount of initiator employed is preferably from 0.01 to 1.0% by weight, based on the overall weight of the comonomers.

It is possible to employ further customary auxiliaries, such as buffer substances, regulators or inhibitors of premature polymerization. In a preferred embodiment the comonomer mixtures I and II are polymerized in the presence of polymerization regulators in the customary amounts; for example, in the presence of n-dodecyl mercaptan, t-dodecyl mercaptan, mercaptopropionic acid, methyl mercaptopropionate, isopropanol or acetaldehyde.

The text below describes in more detail a particularly preferred embodiment of the process:

The monomers of the comonomer mixture I that is specified under b) are charged to a reaction vessel together with deionized water, from 0.5 to 10% by weight, preferably from 1 to 5% by weight, based in each case on comonomer mixture I, of a preferably anionic emulsifier or emulsifier mixture and, if desired, further customary additives, such as buffers, regulators and inhibitors, and a pH of from 2 to 5, preferably from 2.5 to 4, is established by adding preferably volatile acids or bases such as formic acid or ammonia, for example. Following the addition of the monomers specified under a) and establishment of the polymerization temperature of from 40° C. to 90° C., preferably from 60° C. to 80° C., the polymerization is started by adding an initiator.

As soon as the monomers of the comonomer mixture I have undergone from 40 to 99%, preferably from 50 to 95%, conversion, the metered addition of the comonomer mixture II, of the remaining emulsifier and of the remaining water in the form of a preemulsion is begun; if desired, ethylene is injected. In the case of the copolymerization of ethylene the ethylene pressure is preferably maintained at from 8 to 80 bar during the polymerization and allowed to drop toward the end of polymerization by shutting off the ethylene supply. After the end of the addition of the comonomer mixture II the supply of initiator is maintained until the monomers employed have undergone more than 90%, preferably more than 99%, conversion, except for any ethylene used. Subsequently, the pH of the dispersion is adjusted to levels of between 6 and 10, preferably between 7 and 9, any overpressure present is released, and the dispersion is degassed by applying reduced pressure, subjected to conventional stripping if desired, and then cooled.

Especially when ethylene is copolymerized into the core polymer, from 1 to 10% by weight of the comonomer mixture II is introduced into the reaction vessel together with the monomers of the comonomer mixture I as a swelling agent which features little or no copolymerizability with the comonomers a) and b). For this purpose it is possible to employ only those comonomers c) which, under the conditions of the polymerization of the shell polymer, undergo little or no copolymerization with the monomers a) and b). These are vinyl acetate and vinyl esters of carboxylic acids having 5 to 10 carbon atoms, such as vinyl pivalate, vinyl ethylhexanoate, VeoVa9®, VeoVa10®.

The aqueous dispersions obtainable with the process of the invention have a solids content of from 30 to 75% by weight, preferably from 40 to 65% by weight. To prepare water-redispersible polymer powders the aqueous dispersions can be dried by means, for example, of fluidized-bed drying, freeze drying or spray drying. The dispersions are preferably spray dried. Spray drying takes place in this case in customary spray drying units, with atomization taking place by means of single-, dual- or multi-substance nozzles or with a rotating disc. The exit temperature is generally chosen in the range from 55° C. to 100° C., preferably from 70° C. to 90° C., depending on the unit, resin Tg and desired degree of drying.

To ensure redispersibility, protective colloids are added to the dispersion as an atomizing aid prior to drying. In general the atomizing aid is employed in an amount of from 5 to 25% by weight, based on the polymeric constituents of the dispersion. Suitable atomizing aids are known to the skilled worker. Preference is given to partially hydrolyzed polyvinyl acetates, polyvinylpyrrolidones; polysaccharides in water-soluble form, such as starches, celluloses and their carboxymethyl, methyl, hydroxyethyl and hydroxypropyl derivatives; proteins, such as casein or caseinate; ligninsulfonates; synthetic polymers, such as poly(meth)acrylic acid, copolymers of (meth)acrylates with carboxyl-functional comonomer units, poly(meth)acrylamide, polyvinylsulfonic acids and water-soluble copolymers thereof; melamine-formaldehydesulfonates, naphthalene-formaldehydesulfonates, styrene-maleic acid copolymers and vinyl ether-maleic acid copolymers.

At the atomization stage, a content of up to 1.5% by weight of antifoam, based on the base polymer, has frequently been found favorable. In order to increase the storage life by improving the blocking stability, especially in the case of powders of low glass transition temperature, an antiblocking (anticaking) agent can be added to the resulting powder, preferably in an amount of up to 30% by weight based on the overall weight of polymeric constituents. Examples of antiblocking agents are Ca and Mg carbonate, talc, gypsum, silica and silicates having particle sizes preferably in the range from 10 nm to 10 $\mu$m.

The aqueous dispersions and the water-redispersible dispersion powders of the core-shell copolymers are suitable for preparing polymer-bound plasters having good water resistance, full heat insulation systems, and interior and exterior paints having good abrasion resistance. The dispersions are particularly suitable, in addition, for preparing of water-resistant dispersion tile adhesives.

The examples which follow serve to illustrate the invention.

EXAMPLE 1

170 ml of deionized water, 28 g of a 15% strength y weight aqueous solution of sodium alkylbenzene-sulfonate, 9 g of an aqueous 30% strength by weight solution of acrylamide, 9 g of an aqueous 58% strength by weight solution of acrylamidomethyl-propanesulfonic acid and 8.5 g of methacrylic acid were placed in a stirred autoclave having a capacity of about 2 l. The pH was adjusted to 3.5 with dilute ammonia. The autoclave was then evacuated, flushed with nitrogen and evacuated again, and a mixture of 39 g of butyl acrylate and 43 g of methyl methacrylate was introduced under suction. After heating to 70° C., 30 ml of an aqueous 3% strength by weight solution of ammonium persulfate were added over the course of 3 minutes. 45 minutes later, the monomers introduced initially had undergone 90% conversion. At this point in time the pH of the initial latex was adjusted to 8–10 and 15 bar of ethylene were injected. At the same time, the metered addition of a 3% strength by weight aqueous solution of tert-butyl hydroperoxide was begun at a rate of 36 ml/h and of a 3% strength by weight aqueous solution of Brüggolit (alkali metal formaldehydesulfoxylate) at a rate of 36 ml/h, together with a preemulsion consisting of 510 g of water, 105 g of a 35% strength by weight aqueous solution of a nonylphenol polyethylene oxide sulfate with about 25 mol of ethylene oxide per mole of emulsifier, 262 g of VeoVas®10, 689 g of vinyl acetate, 2.2 g of 3-mercaptopropyltrimethoxysilane (Silan GF70 from Wacker-Chemie) and 7.6 g of vinyltriethoxysilane (Silan GF 56 from Wacker-Chemie). During this period, the pH was maintained at between 5 to 6 by adding NH$_3$ and the ethylene pressure was maintained at 15 bar.

After the end of the metered addition of preemulsion, the metering of ethylene was stopped. After one hour at 70° C., the metered addition of initiator was stopped, the pH was adjusted to 8.5 by adding ammonia, ethylene was blown off, and the dispersion was stirred under reduced pressure for 1 hour more.

Analysis revealed an ethylene content of 4%, a solids content of 49.8% and a viscosity (Brookfield viscometer, 20° C., 20 rpm) of 250 mPas. The product showed a minimum film-forming temperature of 16° C.

EXAMPLE 2 (COMPARATIVE)

The procedure of Example 1 was repeated with the difference that only 9.8 g of vinyltriethoxysilane were employed in the monomer feed for the core instead of the mixture of 2.2 g of 3-mercaptopropyltrimethoxysilane and 7.6 g of vinyltriethoxysilane.

EXAMPLE 3

The procedure of Example 1 was repeated with the difference that 7.6 g of 3-mercaptopropyl-trimethoxysilane and 2.2 g of vinyltriethoxysilane were employed in the monomer feed (proportion inverted relative to that in Example 1).

EXAMPLE 4

The procedure of Example 1 was repeated with the difference that only 9.8 g of 3-mercaptopropyltrimethoxysilane and no vinyl triethoxysilane were employed in the monomer feed.

EXAMPLE 5 (COMPARATIVE)

The procedure of Example 1 was repeated with the difference that no 3-mercaptopropyltrimethoxysilane and no vinyltriethoxysilane were employed in the monomer feed.

EXAMPLE 6 (COMPARATIVE)

The procedure of Example 1 was repeated with the difference that, instead of the metered addition of 2.2 g of 3-mercaptopropyltrimethoxysilane and 7.6 g of vinyltriethoxysilane, 9.8 g of 3-mercaptopropyltrimethoxysilane were copolymerized in the initial charge (shell).

EXAMPLE 7 (COMPARATIVE)

The procedure of Example 1 was repeated with the difference that, instead of the metered addition of 2.2 g of 3-mercaptopropyltrimethoxysilane and 7.6 g of vinyltriethoxysilane, 9.8 g of vinyltriethoxysilane were copolymerized in the initial charge (shell).

Performance testing:

For applications-related testing, the dispersions from the inventive examples and comparative examples were tested in a formulation for tile adhesives. Test formulation for dispersion tile adhesives:

| Parts | Substance |
|---|---|
| 0.20 | water |
| 0.10 | preservative (Parmetol DF 12) |
| 0.15 | dispersant (Styrodex PK 90) |
| 0.20 | thickener (Tylose MHP 30000yp) |
| 0.25 | thickener (Rohagit SD 15) |
| 0.05 | dispersing auxiliary (AMP 90) |
| 0.15 | ammonia |
| 0.15 | defoamer (Agitan 281) |
| 51.80 | CaCO$_3$ filler (Durcal 40) |
| 8.50 | CaCO$_3$ filler (Durcal 10) |
| 37.75 | dispersion (solids content 50% by weight) |

The adhesives of the above formulation were adjusted using film-forming auxiliary (1:1 mixture of Dowanol DPnB and Dowanol PnB) to a minimum film-forming temperature of 0° C.

The dispersions obtained in the inventive and comparative examples were stored for 1 week, 6 months and 12 months and thereafter used to produce adhesives of the above formulation with which ceramic tiles were bonded to concrete. The tensile adhesion strength of the bonded tiles was tested in accordance with DIN 18156 after 28 days' storage under standard climatic conditions (dry) and after 28 days' storage under standard climatic conditions with an additional 21 days of storage in water (wet). The test results are summarized in Table 1.

The test results show that, with the combination of mercaptosilane units and vinylsilane units in the core polymer, good wet adhesion is still obtained even after 12 months (Example 1, Example 3). If the core contains only mercaptosilane, the wet adhesion following a 12-month storage period drops sharply (Example 4). Where the core contains only vinylsilane units (Comparative Example 2) or neither mercaptosilane nor vinylsilane (Comparative Example 5) wet adhesion is no longer achieved after only 6 months. If the mercaptosilane units are incorporated only into the shell (Comparative Example 6) the results are even poorer than in the case of silane-free polymers (Comparative Example 5). If vinylsilane is incorporated into the shell, wet adhesion is no longer obtained after 6 months (Comparative Example 7).

TABLE 1

| | Tensile adhesion strength [N/mm$^2$] | | | | | |
|---|---|---|---|---|---|---|
| | 1 week | | 6 months | | 12 months | |
| | dry | wet | dry | wet | dry | wet |
| Ex. 1 | 2.31 | 0.55 | 2.17 | 0.51 | 2.19 | 0.42 |
| C.Ex. 2 | 1.98 | 0.16 | 2.12 | —* | 2.03 | —* |
| Ex. 3 | 2.09 | 0.37 | 2.03 | 0.36 | 2.13 | 0.32 |
| Ex. 4 | 2.14 | 0.31 | 2.17 | 0.25 | 2.08 | 0.11 |
| C.Ex. 5 | 2.16 | 0.11 | 2.02 | —** | 2.12 | —** |
| C.Ex. 6 | 1.89 | —* | 1.93 | —* | 1.76 | —* |
| C.Ex. 7 | 2.12 | 0.16 | 1.87 | —** | | —** |

*= tiles fell off; **adhesion too low for measurement range

What is claimed is:

1. A storage-stable, silane-modified core-shell copolymer comprising a shell-forming copolymer I of
   a) from 70 to 95% by weight, based on the overall weight of the shell, of acrylic and/or methacrylic $C_1$- to $C_{10}$-alkyl esters of which from 20 to 80% by weight have a water solubility of not more than 2 g/l and from 80 to 20% by weight, based in each case on the comonomers a), have a water solubility of at least 10 g/l, and
   b) from 5 to 30% by weight, based on the overall weight of the shell, of one or more ethylenically unsaturated, functional and water-soluble monomers including a proportion of from 25 to 100% by weight, based on the comonomers b), of unsaturated carboxylic acids, and a core-forming copolymer II of one or more monomers c) from the group of the vinyl esters, monoolefinically unsaturated mono- or dicarboxylic esters, vinylaromatic compounds, olefins, 1,3-dienes and vinyl halides, wherein the shell contains no silane compounds and the core comprises one or more silane compounds d) from the group of the mercaptosilanes alone or in combination with one or more olefinically unsaturated, hydrolyzable silicon compounds.

2. A storage-stable, silane-modified core-shell copolymer as claimed in claim 1 which comprises one or more mercaptosilanes of the general formula HS—CR$_2$—SiR'$_3$ in which R is identical or different at each occurrence and has the definition H and $C_1$- to $C_6$-alkyl group, R' is identical or different at each occurrence and has the definition $C_1$- to $C_6$-alkyl group and $C_1$- to $C_6$-alkoxy group, at least one of the radicals R' being an alkoxy group.

3. A storage-stable, silane-modified core-shell copolymer as claimed in claim 1 which comprises in combination with the mercaptosilanes one or more olefinically unsaturated, hydrolyzable silicon compounds of the general formula $R^1Si(CH_3)_{0-2}(OR^2)_{3-1}$, where $R^1$ has the definition $(CH_2)=CR^3-(CH_2)_{0-1}$ or $CH_2=CR^3CO_2(CH_2)_{1-3}$, $R^2$ is an unbranched or branched, unsubstituted or substituted alkyl radical having 3 to 12 carbon atoms which can if desired be interrupted by an ether group, and $R^3$ is H or $CH_3$.

4. A storage-stable, silane-modified core-shell copolymer as claimed in claim 1, wherein the core-shell copolymer comprises from 5 to 15% by weight of a shell copolymer I of
   a) from 80 to 95% by weight, based on the overall weight of the shell, of comonomer a), of which from 30 to 70% by weight is butyl acrylate and/or ethylhexyl acrylate and from 70 to 30% by weight, based in each case on the overall weight of the comonomers a), is ethyl acrylate and/or methyl methacrylate,
   b) from 4.5 to 19.5% by weight, based on the overall weight of the shell, of acrylic acid and/or methacrylic acid, alone or together with acrylamide and/or methacrylamide, and
   c) from 0.01 to 10% by weight, based on the overall weight of the shell, of one or more sulfonate-functional monomers selected from the group consisting of vinyl sulfonate, sulfoethyl and sulfopropyl methacrylate, styrenesulfonic acid, allyl sulfonate, methallyl sulfonate and acrylamidomethylpropanesulfonic acid.

5. A storage-stable, silane-modified core-shell copolymer as claimed in claim 1, wherein the core shell copolymer comprises from 85 to 95% by weight of a core polymer II which is based on at least one member selected from the groups consisting of vinyl chloride-ethylene, vinyl chloride-ethylene-vinyl acetate, vinyl chloride-ethylene-VeoVa9®, vinyl chloride-ethylene-VeoVa10®, vinyl acetate-ethylene, vinyl acetate-VeoVa9®, vinyl acetate-VeoVa10®, methyl methacrylate-2-ethylhexyl acrylate, methyl methacrylate-butyl acrylate, methyl methacrylate-butyl acrylate-VeoVa9®, methyl methacrylate-butyl acrylate-VeoVa10®, styrene-butyl acrylate, styrene-butyl acrylate-VeoVa9®, styrene-butyl acrylate-VeoVa10®, styrene-2-ethylhexyl acrylate, styrene-2-ethylhexyl acrylate-VeoVa9®, styrene-2-ethylhexyl acrylate-VeoVa10®, and styrene-1,3-butadiene mixtures.

6. A storage-stable, silane-modified core-shell copolymer as claimed in claim 5, wherein the core polymer II also comprises from 0.01 to 10% by weight of mercaptosilanes selected from the group consisting of 3-mercaptopropyltriethoxysilane, 3-mercaptopropyltrimethoxysilane and 3-mercaptopropylmethyldimethoxysilane, or from 0.01 to 10% by weight, based on the overall weight of the core polymer II, of at least one of said mercaptosilanes and at least one olefinically unsaturated silane selected from the group consisting of gamma-acryl- and gamma-methacryloxypropyltri(alkoxy)silanes, vinyltrialkoxysilanes and trisacetoxyvinylsilane in a weight ratio of from 1:20 to 20:1.

7. A process for preparing storage-stable, silane-modified core-shell copolymer dispersions and powders by free-radical emulsion polymerization of a comonomer mixture I comprising
   a) from 70 to 95% by weight, based on the overall weight of the comonomer mixture I, of acrylic and/or methacrylic $C_1$- to $C_{10}$-alkyl esters of which from 20 to 80% by weight have a water solubility of not more than 2 g/l and from 80 to 20% by weight, based in each case on the comonomers a), have a water solubility of at least 10 g/l, and
   b) from 5 to 30% by weight, based on the overall weight of the comonomer mixture I, of one or more ethylenically unsaturated, functional and water-soluble monomers including a proportion of from 25 to 100% by weight, based on the comonomers b), of unsaturated carboxylic acids, and the comonomer mixture I is introduced into a reactor together with water and emulsifier at a pH of from 2 to 5, polymerization is started by adding an initiator at a temperature of from 40° C. to 90° C. and, at a conversion of at least 40% of the comonomer mixture I, a comonomer mixture II comprising one or more monomers c) selected from the group consisting of the vinyl esters, monoolefinically unsaturated mono- or dicarboxylic esters, vinylaromatic compounds, olefins, 1,3-dienes and vinyl halides is metered in, alone or with further emulsifier and initiator, and the resulting copolymer dispersion is dried if desired, wherein the comonomer mixture I contains no silane compounds and the comonomer mixture II comprises one or more silane compounds d) from the group of the mercaptosilanes alone or in combination with one or more olefinically unsaturated, hydrolyzable silicon compounds.

8. Polymer bound plasters containing the silane modified core shell copolymer of claim 1.

9. Heat insulation systems containing the silane modified core shell copolymer of claim 1.

10. Paint containing the silane modified core shell copolymer of claim 1.

11. Adhesives containing the silane modified core shell copolymer of claim 1.

* * * * *